US012207038B2

(12) United States Patent
Smith et al.

(10) Patent No.: US 12,207,038 B2
(45) Date of Patent: Jan. 21, 2025

(54) OPEN-EAR HEADPHONE

(71) Applicant: Bose Corporation, Framingham, MA (US)

(72) Inventors: Nathan Thomas Smith, Worcester, MA (US); Peter Santoro, Groton, MA (US); Andrew J. LaFosse, Gardner, MA (US)

(73) Assignee: Bose Corporation, Framingham, MA (US)

( * ) Notice: Subject to any disclaimer, the term of this patent is extended or adjusted under 35 U.S.C. 154(b) by 123 days.

(21) Appl. No.: 17/896,380

(22) Filed: Aug. 26, 2022

(65) Prior Publication Data

US 2024/0073582 A1 Feb. 29, 2024

(51) Int. Cl.
*H04R 1/10* (2006.01)

(52) U.S. Cl.
CPC .......... *H04R 1/105* (2013.01); *H04R 1/1016* (2013.01); *H04R 1/1025* (2013.01)

(58) Field of Classification Search
CPC .......................... H04R 1/1033; H04R 1/1066; H04R 2460/09; H04R 2460/11; H04R 25/60; H04R 25/604; H04R 25/609; H01B 7/24
See application file for complete search history.

(56) References Cited

U.S. PATENT DOCUMENTS 7,971,337 B2 * 7/2011 Kral .................... H04R 25/604 381/174
11,140,469 B1 10/2021 Miller et al.
11,736,874 B2 * 8/2023 Rosenwein .............. H04R 3/00 381/315
2016/0219355 A1 * 7/2016 Hansen ................ H04R 1/1091
2021/0076119 A1 3/2021 Graff
2023/0028541 A1 1/2023 Wang
2023/0164501 A1 * 5/2023 Daley .................... H04R 25/65 381/324
2024/0007777 A1 * 1/2024 Sacha .................. H04R 25/609
2024/0007779 A1 * 1/2024 Roberts .................... H04R 1/04

FOREIGN PATENT DOCUMENTS

KR 2018093236 A * 8/2018 ........... H04R 1/1033
KR 20220168204 A * 12/2022
WO 2022021986 A1 2/2022
WO WO-2022248628 A1 * 12/2022 ........... H04R 1/1016

OTHER PUBLICATIONS

International Search Report and Written Opinion dated Dec. 13, 2023 for International Application No. PCT/US2023/031167.

* cited by examiner

*Primary Examiner* — Ryan Robinson

(57) ABSTRACT

A flexible arm that is configured to be located between and physically and electrically connect an acoustic module of an open-ear headphone to a battery housing of the open-ear headphone. The flexible arm includes a flexible printed circuit that extends through the entire original resting length of the flexible arm and comprises a conductor that is configured to carry electrical energy between the acoustic module and the battery housing. A first interface structure is coupled to one of the acoustic module and the battery housing. At least one link member is pivotably coupled to the first interface structure. A flexible material encases at least some of the flexible printed circuit, at least some of the at least one link member, and at least some of the first interface structure.

20 Claims, 20 Drawing Sheets

OPEN-EAR HEADPHONE

BACKGROUND

This disclosure relates to a headphone that is carried on the ear.

Open-ear headphones typically emit sound close to but not in the ear canal.

SUMMARY

All examples and features mentioned below can be combined in any technically possible way.

In one aspect, a flexible arm is configured to be located between and physically and electrically connect an acoustic module of an open-ear headphone to a battery housing of the open-ear headphone. The flexible arm includes a flexible printed circuit that extends through the entire original resting length of the flexible arm and comprises a conductor that is configured to carry electrical energy between the acoustic module and the battery housing. A first interface structure is coupled to one of the acoustic module and the battery housing. At least one link member is pivotably coupled to the first interface structure. A flexible material encases at least some of the flexible printed circuit, at least some of the at least one link member, and at least some of the first interface structure.

Implementations may include one of the following features, or any combination thereof.

In some implementations, the at least one link member is pivotably coupled to the first interface structure via a pivot pin that passes through respective holes in the at least one link member and the first interface structure.

In certain implementations, the at least one link member inhibits twist of the flexible arm.

In some cases, the at least one link member includes a plurality of link members pivotably coupled to each other in series.

In certain cases, the plurality of link members are pivotably coupled to each other via pivot pins that pass through respective holes defined by the plurality of link members.

In some examples, the at least one link member at least partially surrounds the flexible printed circuit.

In certain examples, the flexible arm also includes a guide member coupled to the at least one link member. The flexible printed circuit may pass through a channel in the guide member, thereby coupling the flexible printed circuit to the at least one link member.

In some implementations, the guide member is formed of silicone.

In certain implementations, the guide member is coupled to the at least one link member via an adhesive.

In some cases, the flexible arm also includes a second interface structure that is coupled to the other one of the acoustic module and the battery housing. The at least one link member may be pivotably coupled to the second interface structure.

In certain cases, the at least one link member includes a plurality of link members pivotably coupled to each other and arranged in series between the first interface member and the second interface member.

In some examples, the at least one link member includes a motion limiting feature that limits rotational movement of the link member.

In certain examples, the at least one link member is formed of a rigid plastic.

In some implementations, the at least one link member is formed of metal (e.g., spring steel).

In certain implementations, the flexible material is overmolded on the at least one link member, at least some of the flexible printed circuit and at least some of the first interface structure.

In some cases, the flexible material includes an external layer of the entire flexible arm.

In certain cases, the original resting position of the flexible arm lies along a curved axis that defines a simple open curve.

In some examples, the first interface structure includes one or more centering features to assist within centering the first interface structure within a cavity in the battery housing.

In certain examples, the first interface structure includes one or more guide members that provide a hard stop that butts up against the battery housing to limit inward movement of the first interface structure into a cavity in the battery housing during assembly.

In some implementations, the flexible material defines a gasket that provides a seal between the first interface member and the acoustic module.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1A:
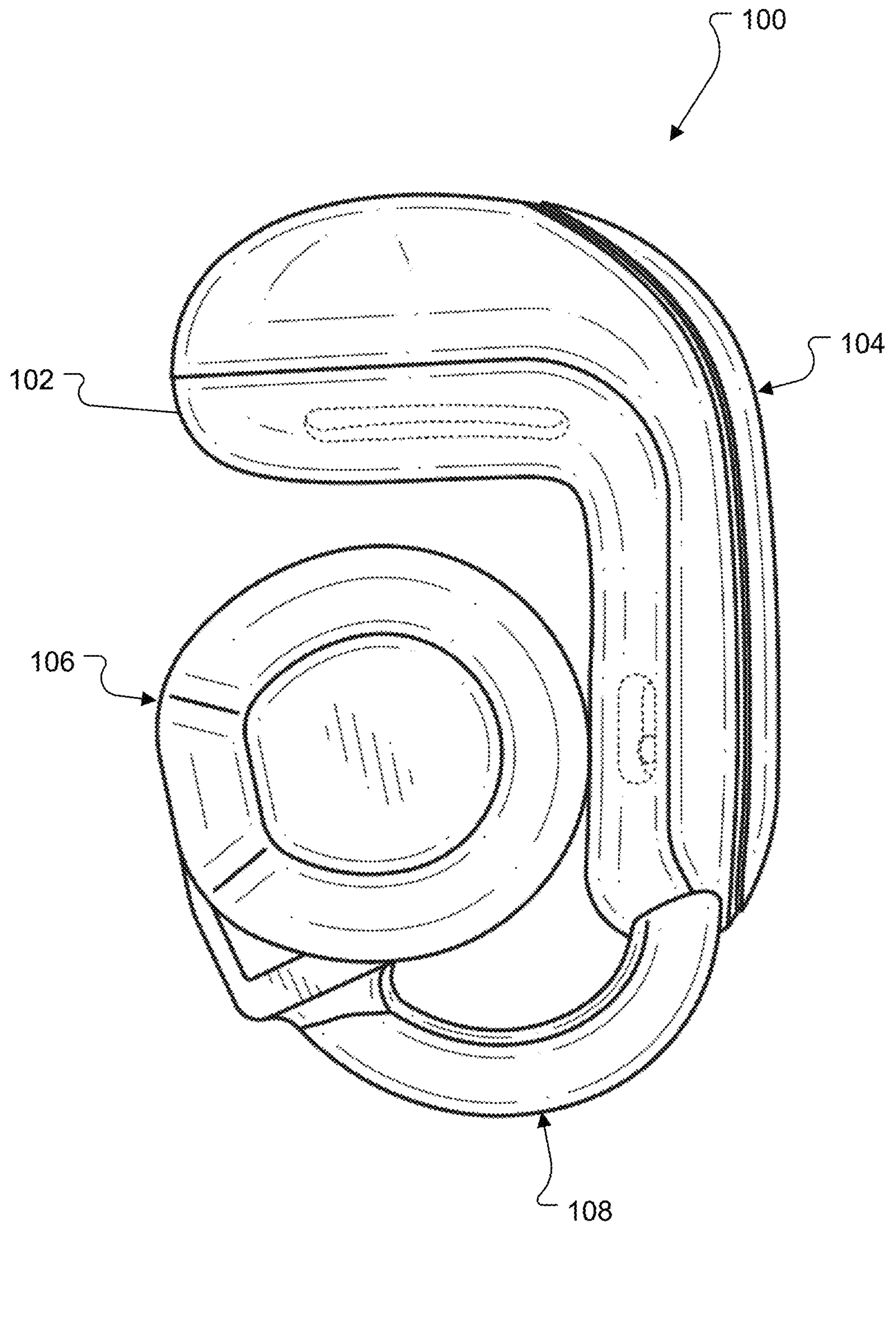
FIG. 1A is a side view of an open-ear headphone.

Open-ear headphones that are carried on the ear should provide high-quality sound, be stable on the ear, be comfortable to wear for long periods of time, be unobtrusive, and look stylish. These goals can be difficult to achieve, as in some respects they have been considered mutually exclusive. For example, stability typically translates into clamping on the outer ear, which can be uncomfortable for long-term wear and also may not look stylish. Also, for high-quality sound there must be sound delivery close to but not in the ear canal, meaning that headphone structure needs to overlie the ear and so may be highly visible to others. Also, for the best sound quality the sound should be delivered close to but not in the ear canal opening.

Examples of the open-ear headphones discussed herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the headphones herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In some examples herein the open-ear headphone includes a flexible arm that is configured to be located between and physically and electrically connect the acoustic module and the battery housing of the headphone. The flexible arm defines an original resting length and position between the acoustic module and the battery housing. The flexible arm includes a flexible printed circuit that extends through the entire original resting length of the flexible arm. The flexible printed circuit includes one or more conductors that carry electrical energy between the acoustic module and the battery housing. An interface structure is coupled to the acoustic module or the battery housing. A flexible material encases at least some of the flexible printed circuit and at least some of the interface structure. In some examples, the length of the flexible printed circuit within the flexible arm is greater than the original resting length of the flexible arm. The flexible printed circuit can thus better accommodate tension or compression on the flexible arm as the flexible arm is bent from its original resting position.

In some examples the original resting position of the flexible arm lies along a curved axis. In an example the curved axis defines a simple open curve. In an example the curved axis is generally "C"-shaped. In an example the curved axis bisects the flexible arm, and different parts of a first surface of the flexible printed circuit lie on different sides of the curved axis. In an example the flexible printed circuit defines at least one simple open curve along its length within the flexible arm. In an example the flexible printed circuit defines a plurality of both simple open upward curves and simple open downward curves along its length within the flexible arm. In an example each simple open downward curve is adjacent to one more of the simple open upward curves.

In various examples, the flexible arm may also include a series of pinned links arranged between and pivotably attached to first and second interface structures. The flexible printed circuit may be threaded through inner channels that are formed in the links, which can provide support and protection for the flexible printed circuit in the region between the interface members. The links may also resist twisting motion, e.g., to inhibit twisting of the flexible arm. The links can be formed of plastic (e.g., cast urethane) or metal (e.g., spring steel) and may be formed in a molding or stamping operation.

Figure 1B:
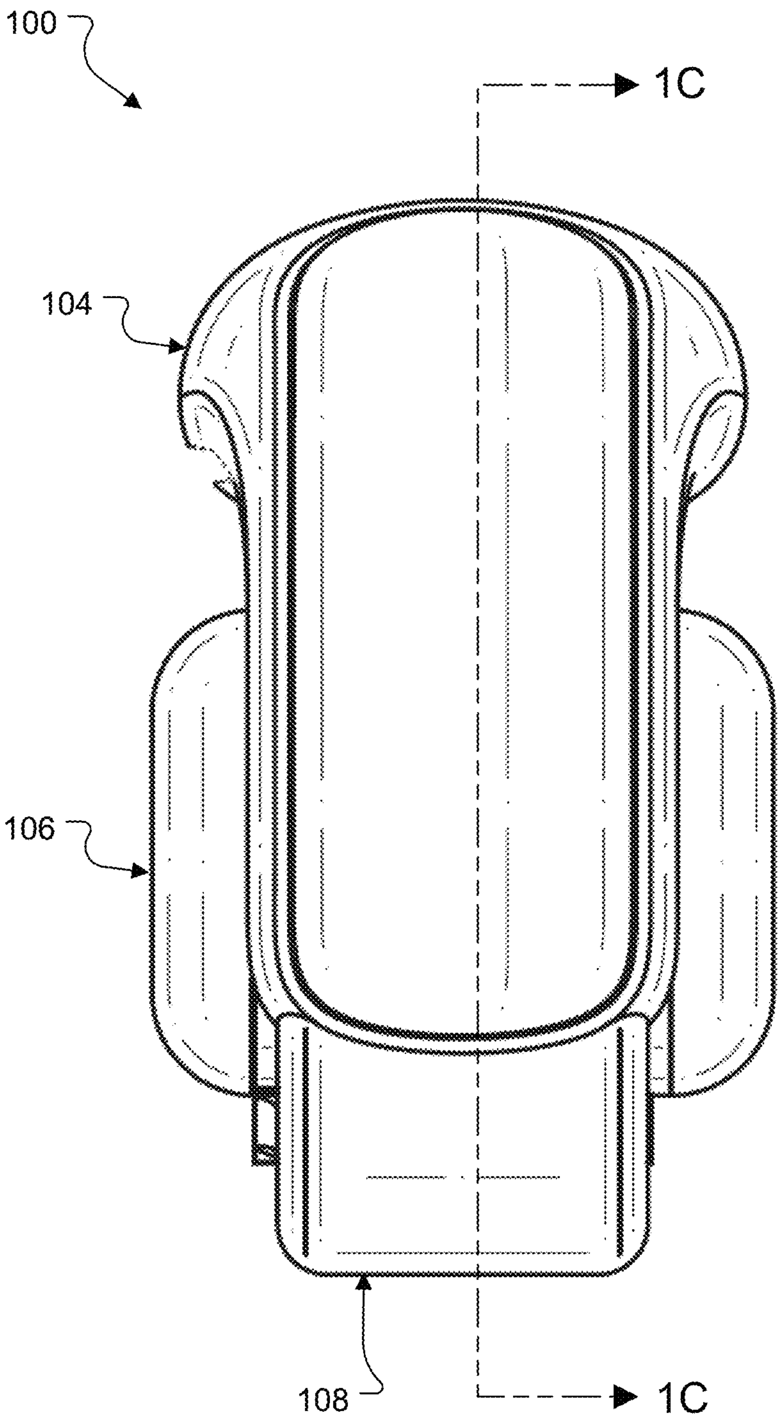
FIG. 1B is a rear view thereof.
Figure 1C:
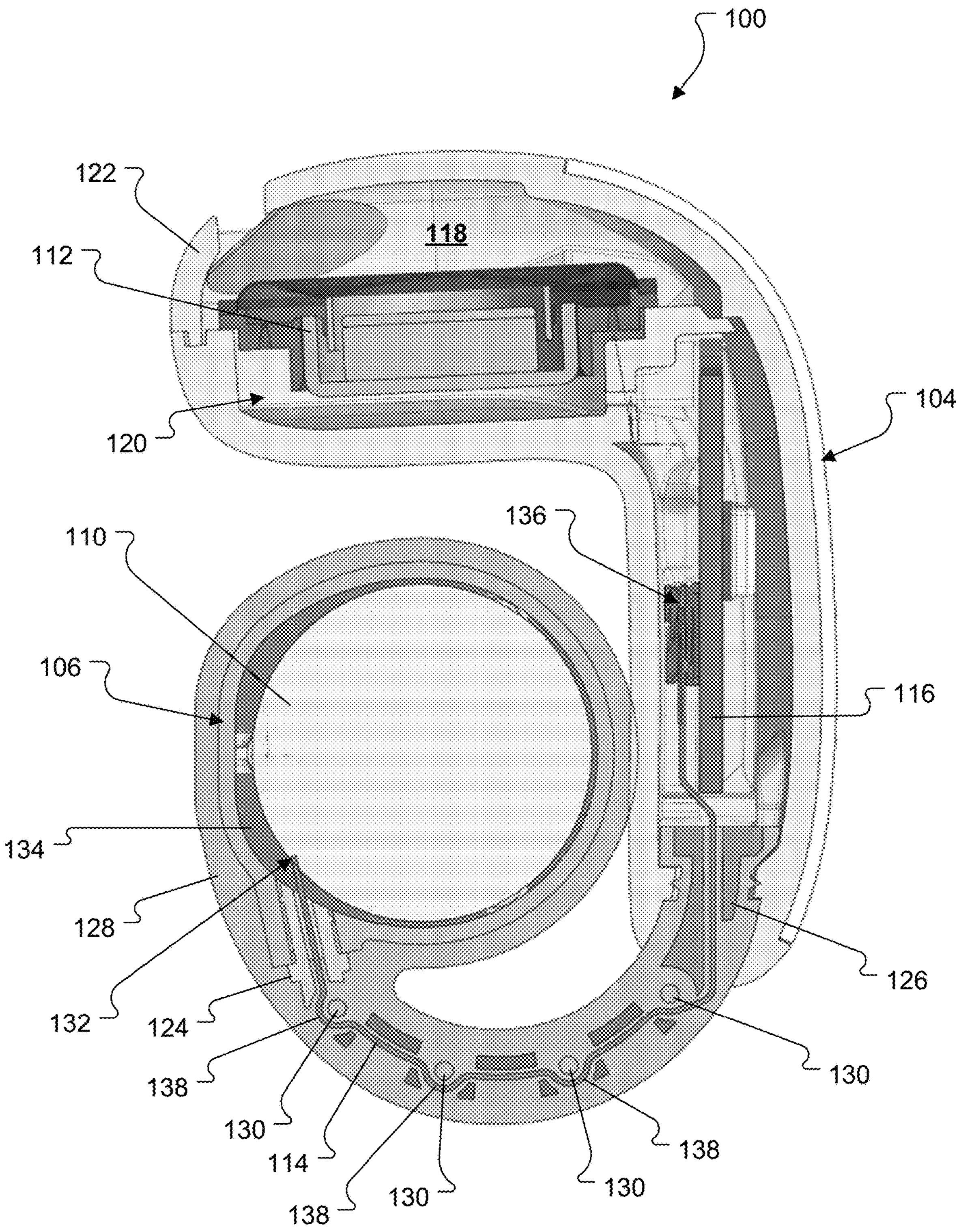
FIG. 1C is a cross-sectional view taken along line 1C-1C, FIG. 1B.
Figure 1D:
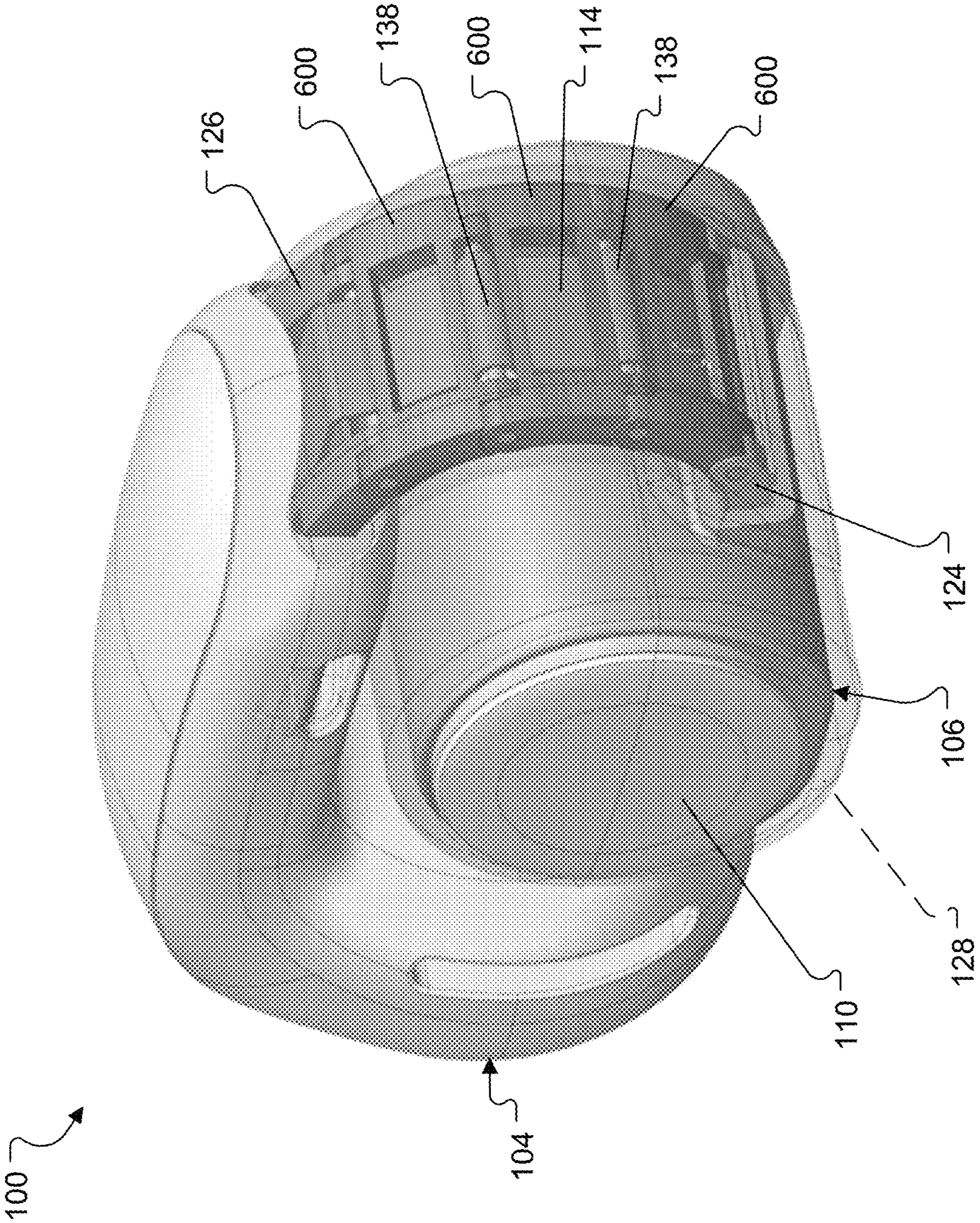
FIG. 1D is a perspective view of the open-ear headphone of FIG. 1A.

FIG. 1A is a side view of open-ear headphone 100, FIG. 1B is a rear view, FIG. 1C is a cross-sectional view taken along line 1C-1C, and FIG. 1D is a perspective view. Headphone 100 is configured to be carried on an ear of a user such that the distal sound-delivery end 102 of its acoustic module 104 is located in the concha of the ear and battery housing 106 is located behind the ear. Flexible arm 108 is configured to pass over the outer side of the helix, anti-helix and/or lobule of the ear. Arm 108 has an original or resting position and length, illustrated in FIGS. 1A-1D. In some examples the original position generally defines a "C"-shape, as shown in these figures. Arm 108 is configured to be flexed at least along its length, so that the space between acoustic module 104 and battery housing 106 can be slightly increased. This allows headphone 100 to be donned and doffed from the ear without needing to push the headphone over the external ear, yet still provides a light clamping force on the ear to help keep headphone 100 in place on the ear as the user's head moves. Note that FIGS. 1A-1D illustrate some interference between acoustic module 104 and battery housing 106. However, in most examples there is actually a space between the two, as disclosed for example in the patent that is incorporated by reference. In some examples, this interference is modeled so that when arm 108 is molded in this shape it will want to "rest" in this position. This modeling helps to create some preload in the arm.

Electrical signals need to be carried through arm 108. In some examples the electrical signals include or comprise the power from the battery 110 in battery housing 106 to the any powered circuitry and components and the acoustic transducer 112 in acoustic module 104. In some examples, the electrical signals also include audio signals from wireless reception and processing circuitry (not shown) that can be located in one or more of arm 108, battery housing 106, and acoustic module 104. In some examples, these electrical signals are carried by conductors of a flexible printed circuit 114. The flexible printed circuit needs to be able to flex as arm 108 is flexed, yet at the same time needs to carry necessary electrical signals.

Flexible printed circuit 114 carries power from a battery 110 to data reception and processing circuitry on printed circuit board 116. Power and audio signals are provided from board 116 to transducer 112. Transducer 112 generates sound pressure in front acoustic cavity 118 and back acoustic cavity 120. Opening(s)/port(s) in acoustic module housing 122 are paths for the sound to escape housing 122. Flexible printed circuit 114, arm interface structures 124 and 126, and flexible over-mold material 128 are further described below.

Additional details of an open-ear headphone, including but not limited to its construction, operation, and details of its acoustic performance, are disclosed in U.S. Pat. No. 11,140,469, the entire disclosure of which is incorporated herein by reference and for all purposes. Aspects of the present open-ear headphone that are disclosed in this patent are not further described herein.

In some examples flexible arm 108 includes one or more interface structures 124, 126. The interface structures are configured to mechanically couple the arm to one or both of the battery housing and the acoustic module. In some examples the interface structures are relatively stiff but have some compliance. The interface structures can be made of an engineered plastic such as a nylon or acrylonitrile butadiene styrene (ABS), or from a rubber or rubber-like material. In some examples the interface structures are made by injection molding or machining or stamping or 3-D printing. In some examples, they are unitary members. The interface structures help to hold the arm in its curved resting position and provide strengthening reinforcements to the arm. In some examples, the interface structures also help to anchor a relatively soft over-mold that covers the entire arm. In some examples the over-mold also covers at least part of the battery housing.

Figure 2A:
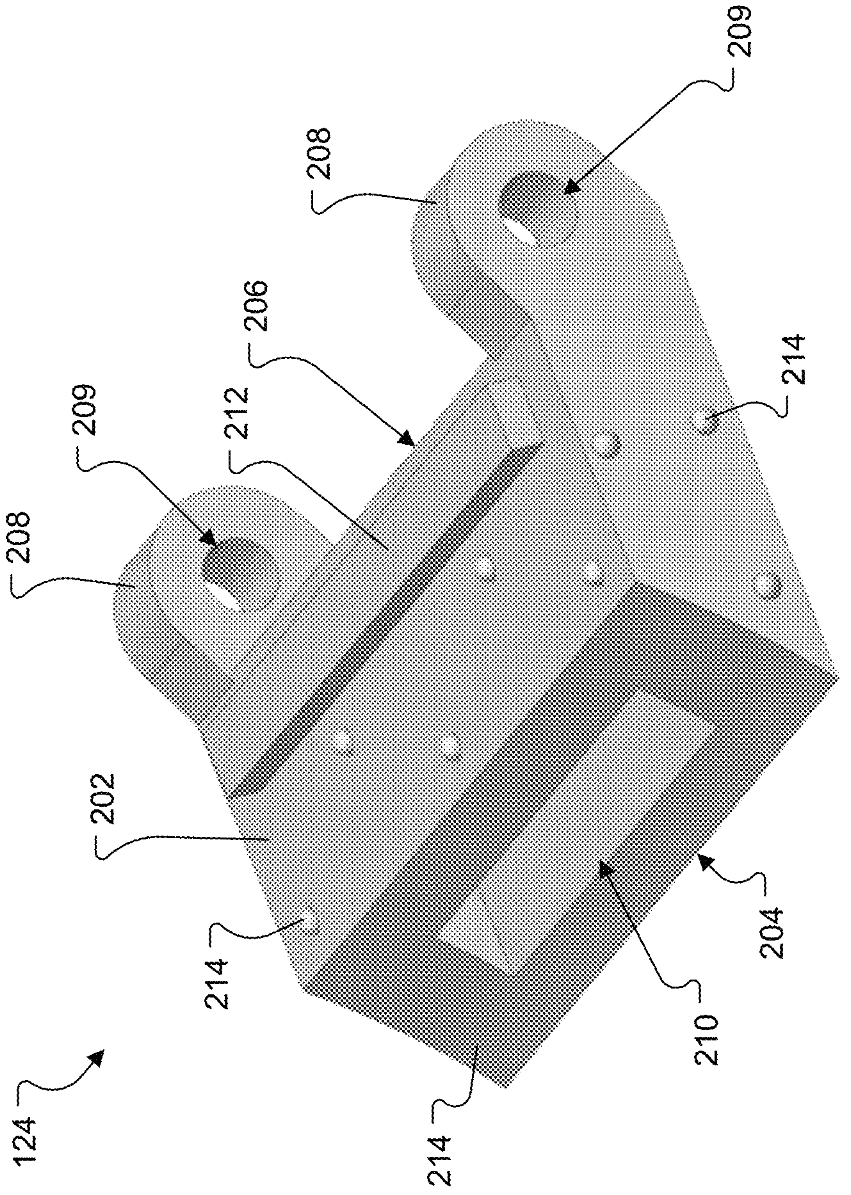
FIG. 2A is a front perspective view of an interface structure for a flexible arm.
Figure 2B:
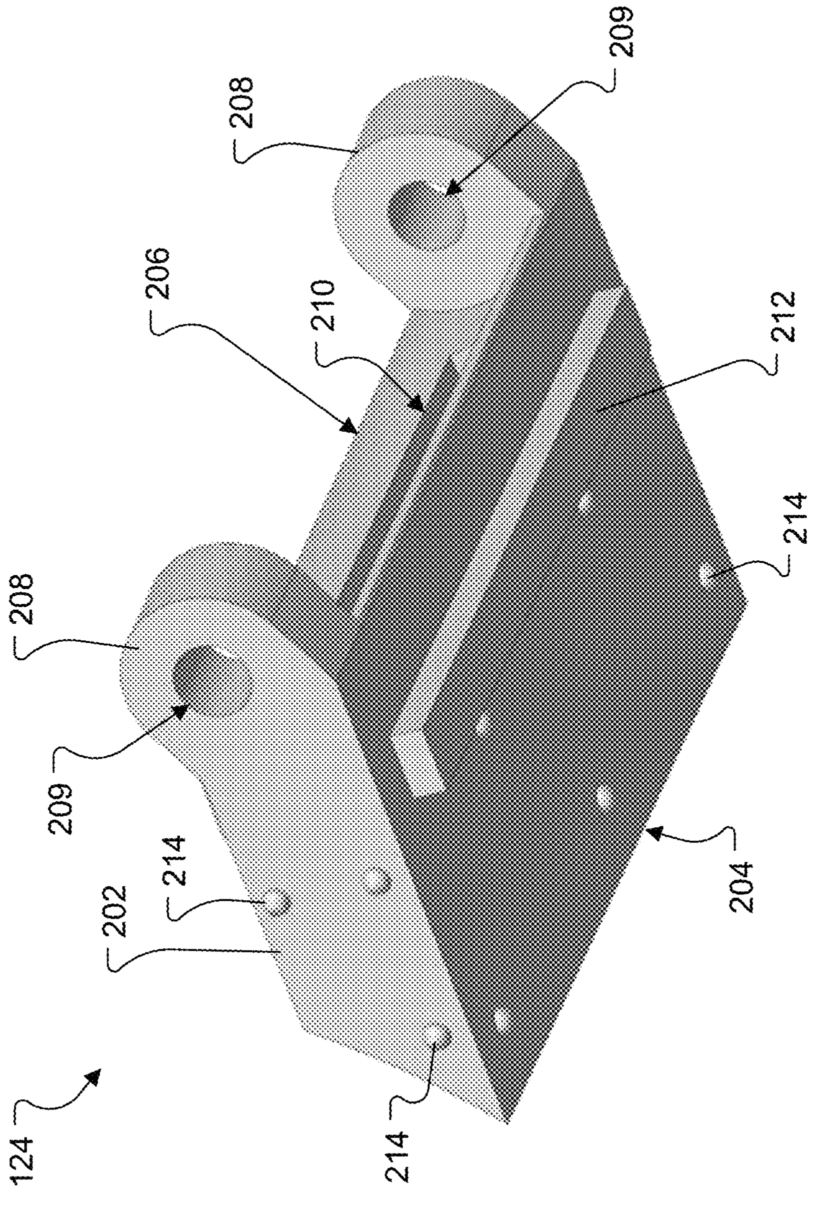
FIG. 2B is a rear perspective view thereof.

A first interface structure 124 is illustrated in FIGS. 2A and 2B. Interface structure 124 is a unitary molded plastic part that defines a main body 202 that extends between a proximal end 204 and a distal end 206 with a pair of pivot arms 208 disposed along the distal end 206 of the main body 202. Each of the pivot arms 208 includes a hole 209 for accommodating a pivot pin 130 (FIG. 1C). The main body 202 defines an opening 210 that extends through its length between the proximal end 204 and the distal end 206. The opening 210 accommodates the flexible printed circuit 114, thereby allowing the flexible printed circuit 114 to pass through the first interface structure 124 and into the battery housing 106.

Figure 3A:
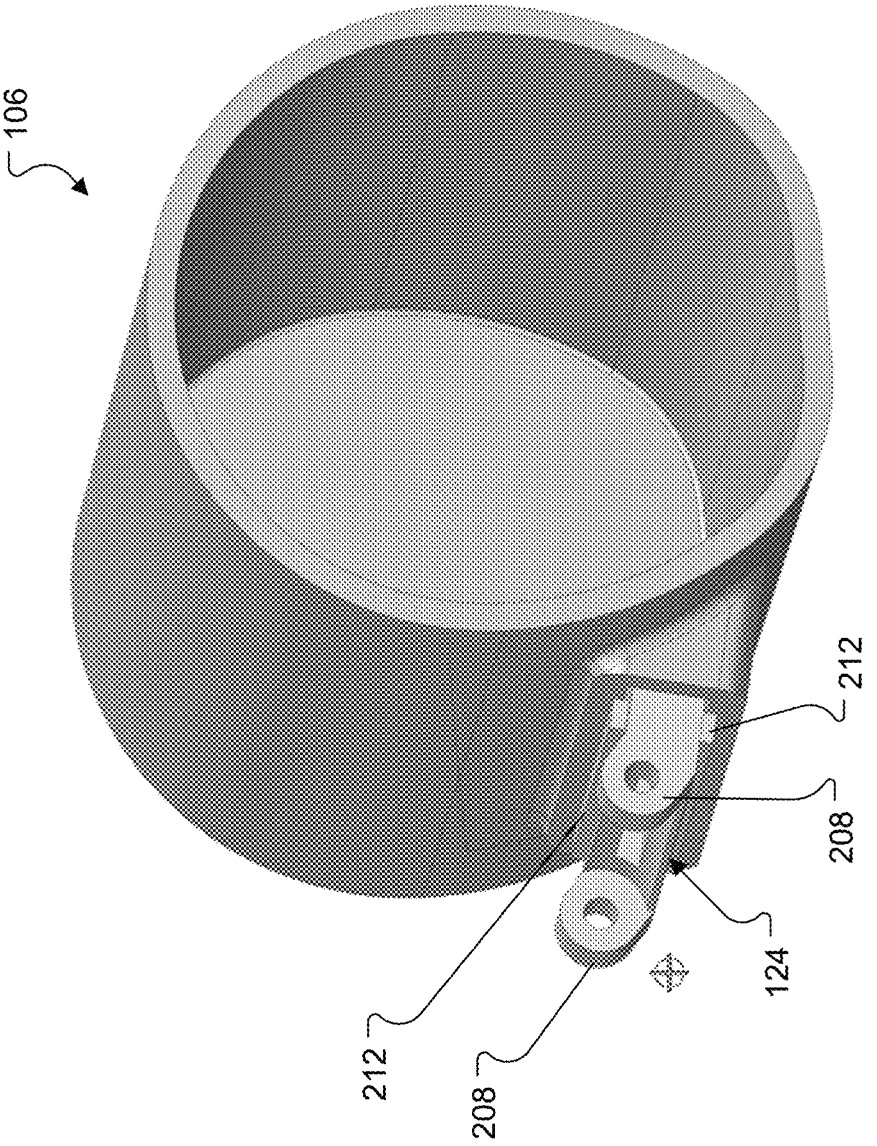
FIGS. 3A and 3B are perspective views of the interface structure of FIGS. 2A and 2B engaged with a battery housing of an open-ear headphone.
Figure 3B:
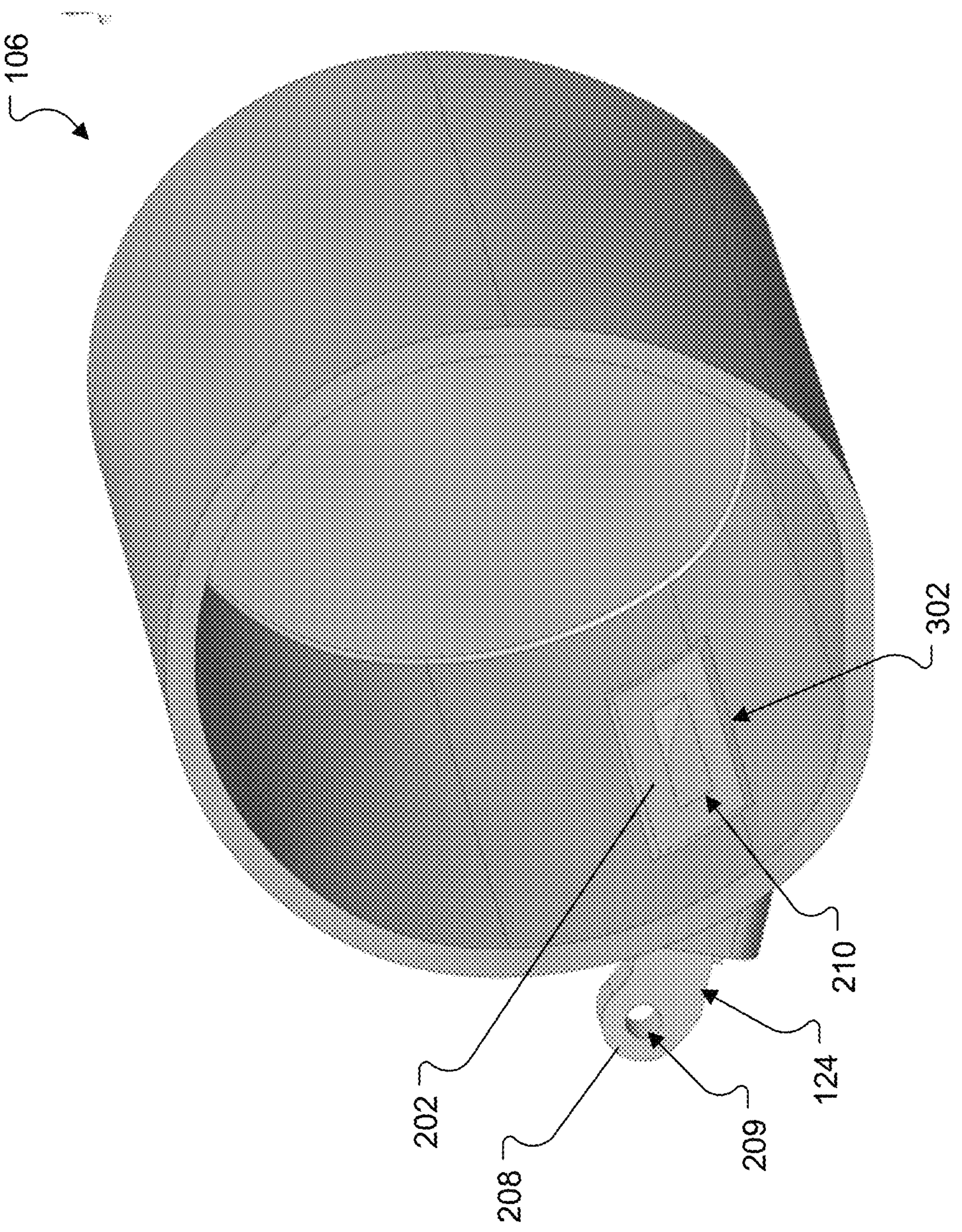

Interface structure 124 is configured to couple the flexible arm 108 to the battery housing 106, help support and guide the flexible printed circuit 114. The main body 202 is configured to be coupled to battery housing 106, as shown in FIGS. 3A & 3B. In some examples, the main body 202 is received in a complimentarily-shaped cavity 302 (FIG. 3B) in battery housing 106 and/or battery housing 106 may be made from two (or more) pieces that are snapped together or otherwise fitted together around the main body 202. An adhesive (such as a pressure sensitive adhesive or an epoxy) may be used to more permanently attach interface structure 124 to battery housing 106.

A pair of guide members 212, shown in the form of protruding bars, are provided along opposing outer surfaces of the main body 202. The guide members 212 provide a hard stop that butts up against the battery housing 106 and prevents further inward movement during assembly. The guide members 212 provide a reference surface to help ensure that the interface structure 124 is properly located during assembly with the battery housing 106. The interface structure 124 further includes a plurality of centering features 214, shown in the form of protruding bumps that extend outwardly from the outer surfaces of the main body 202. These centering features 214 engage the surfaces of the battery housing 106 within cavity 302 to help ensure that the main body 202 is centered within the cavity 302.

Figure 4A:
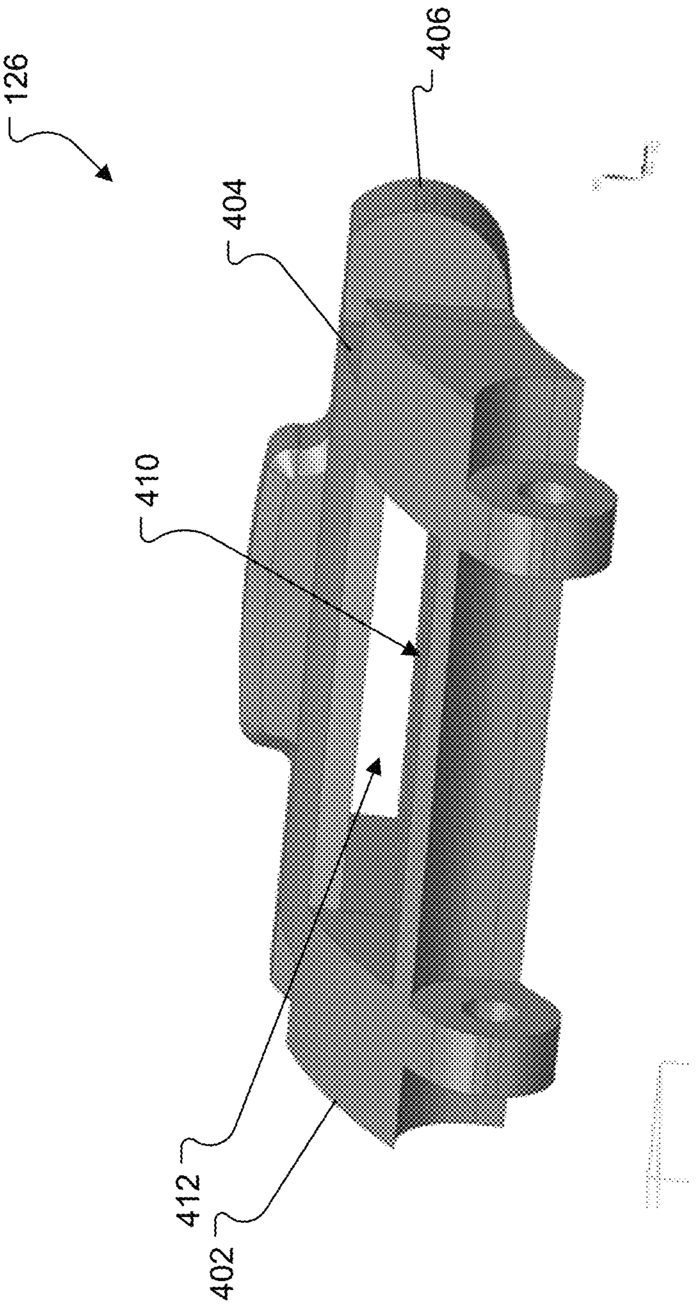
FIGS. 4A, 4B and 4C are various perspective views of another interface structure for a flexible arm.
Figure 4B:
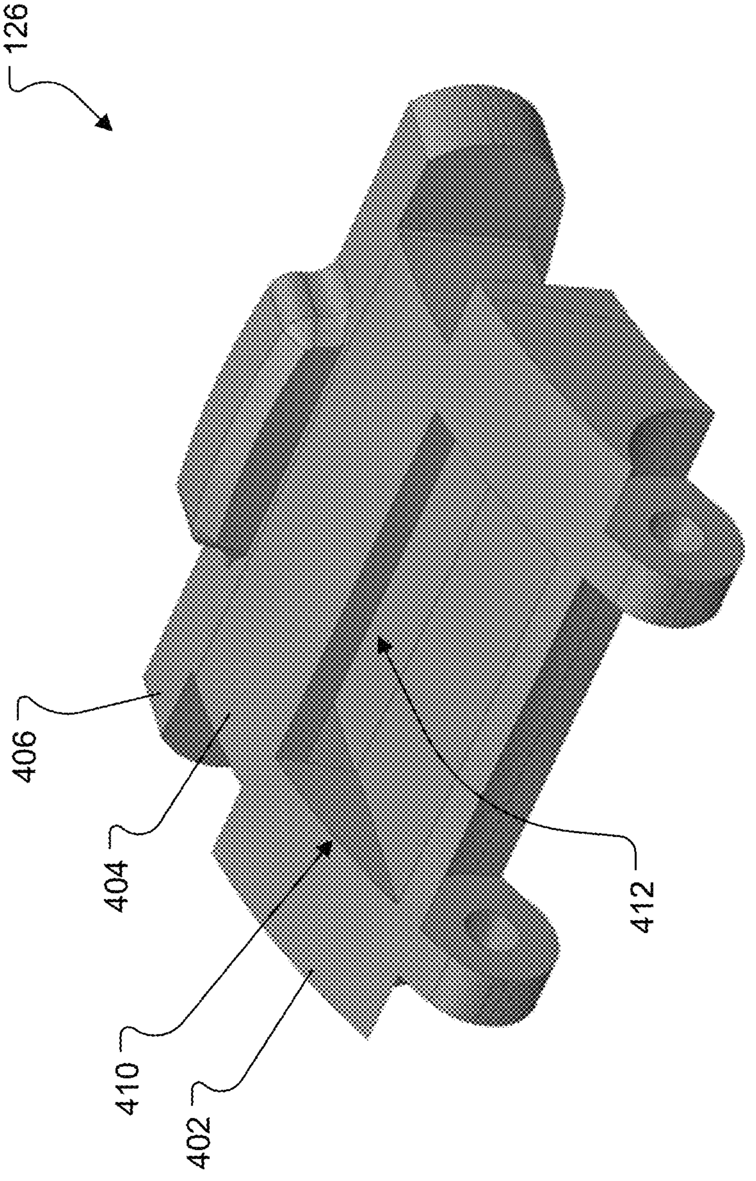
Figure 4C:
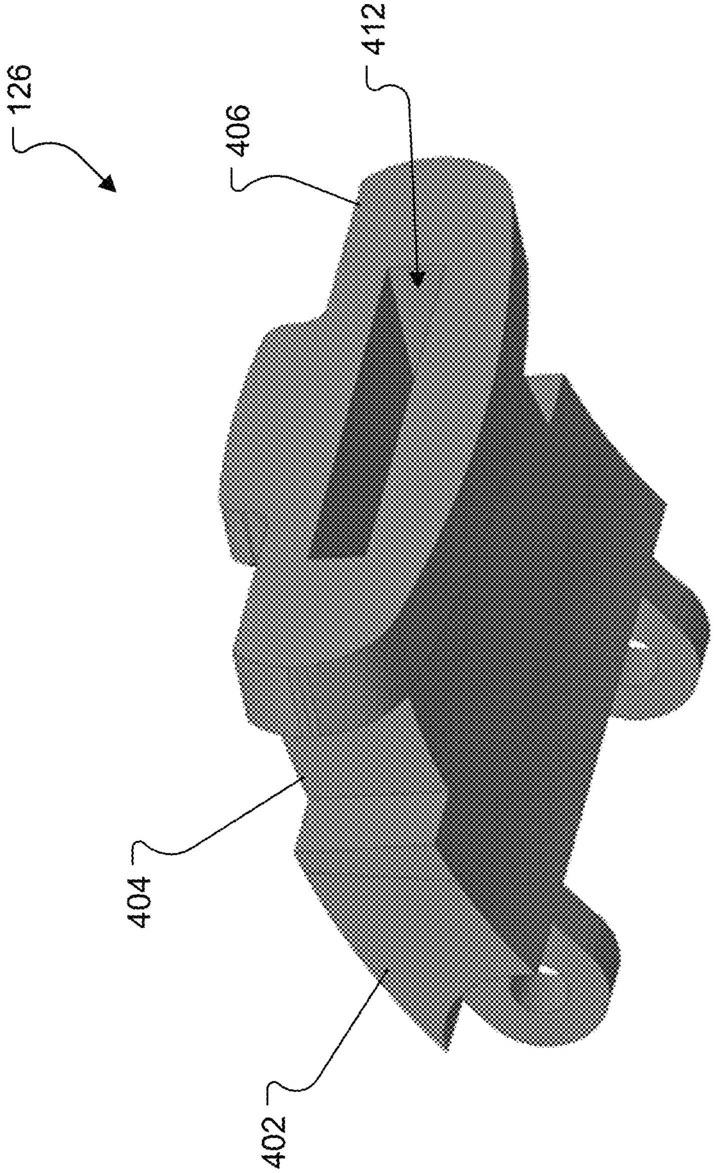

Second interface structure 126, FIGS. 4A-4C, couples flexible arm 108 to acoustic module 104. Interface structure 126 is a unitary molded plastic part that defines a main body 402, an intermediate narrow portion 404, and a terminal enlarged portion 406. The main body 402 defines a recess 410 for accommodating the flexible printed circuit 114.

Figure 5A:
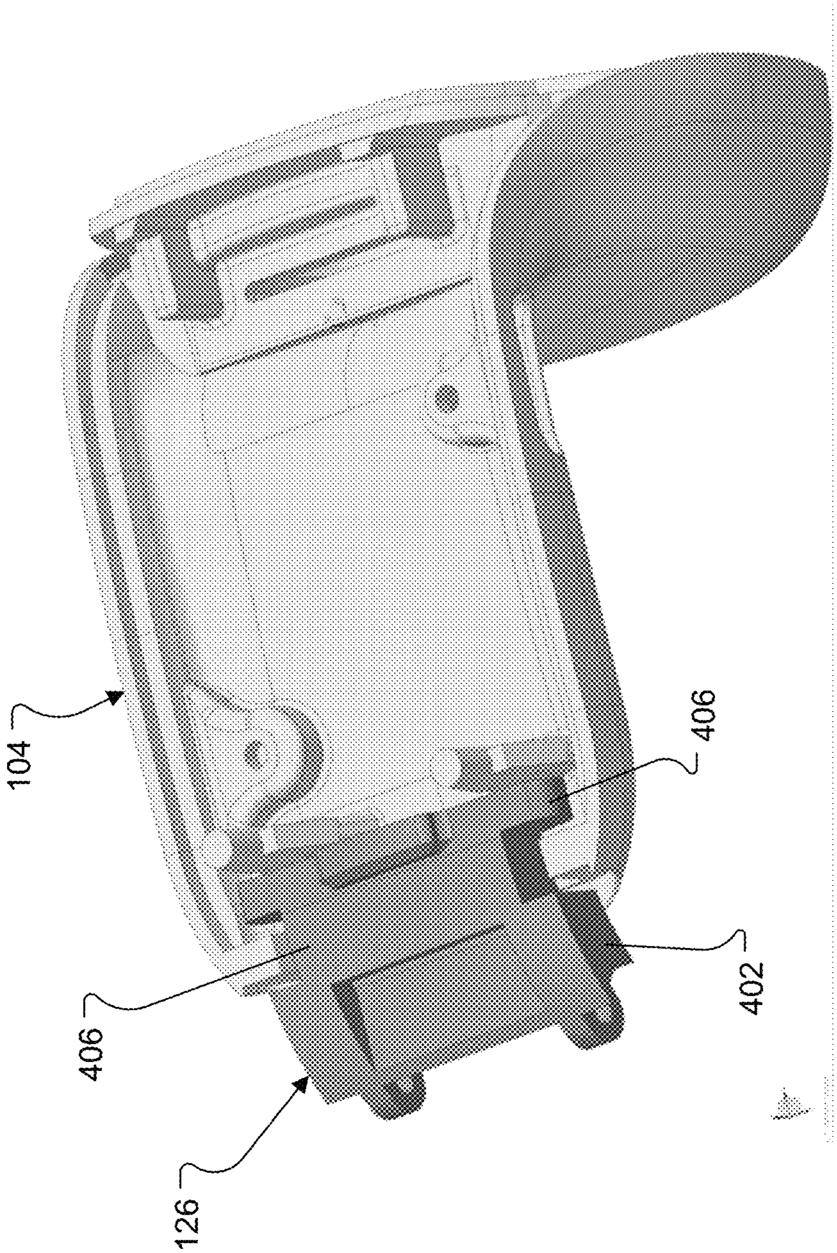
FIGS. 5A, 5B and 5C are perspective views and a rear view, respectively, of the interface structure of FIG. 4A engaged with an acoustic module of an open-ear headphone.
Figure 5B:
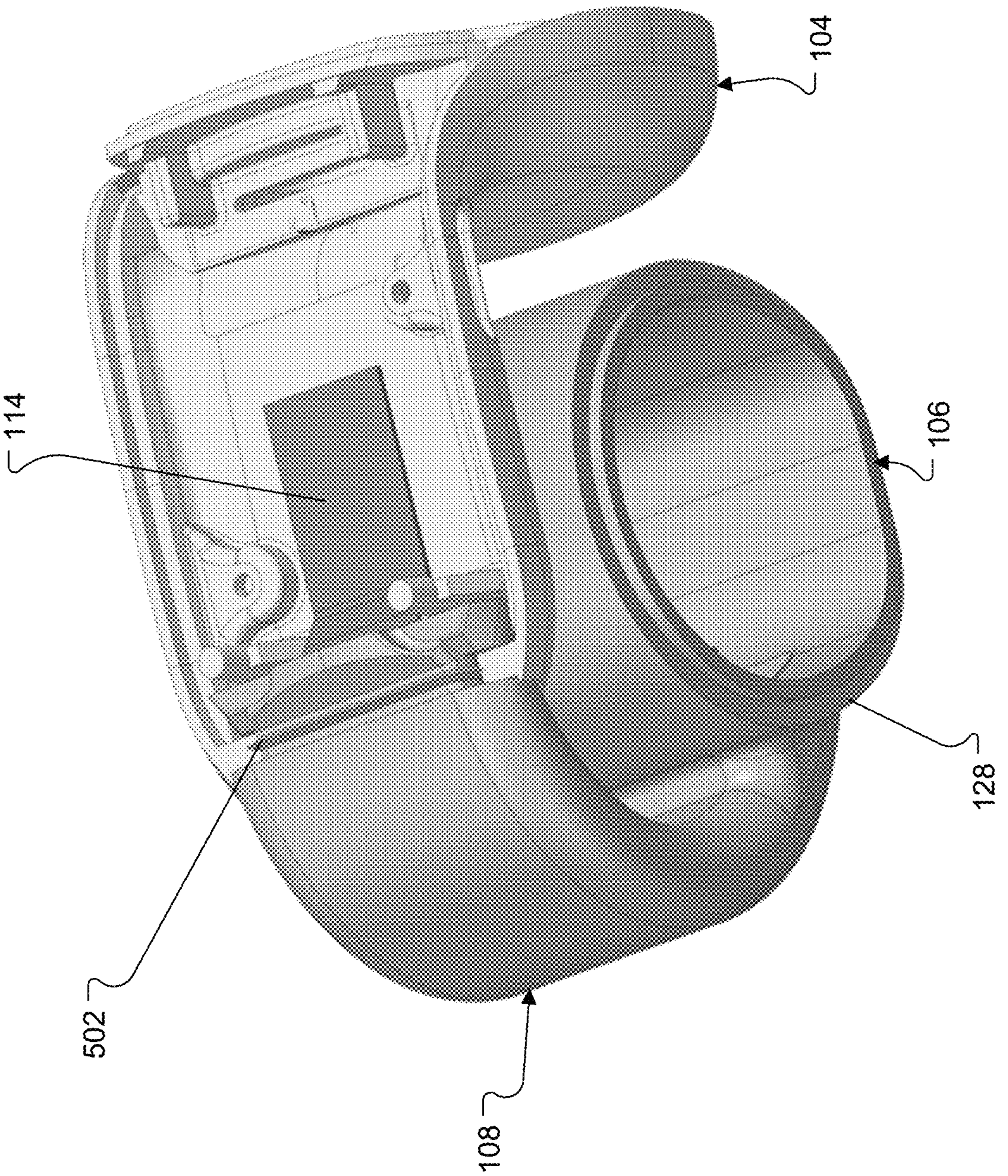
Figure 5C:
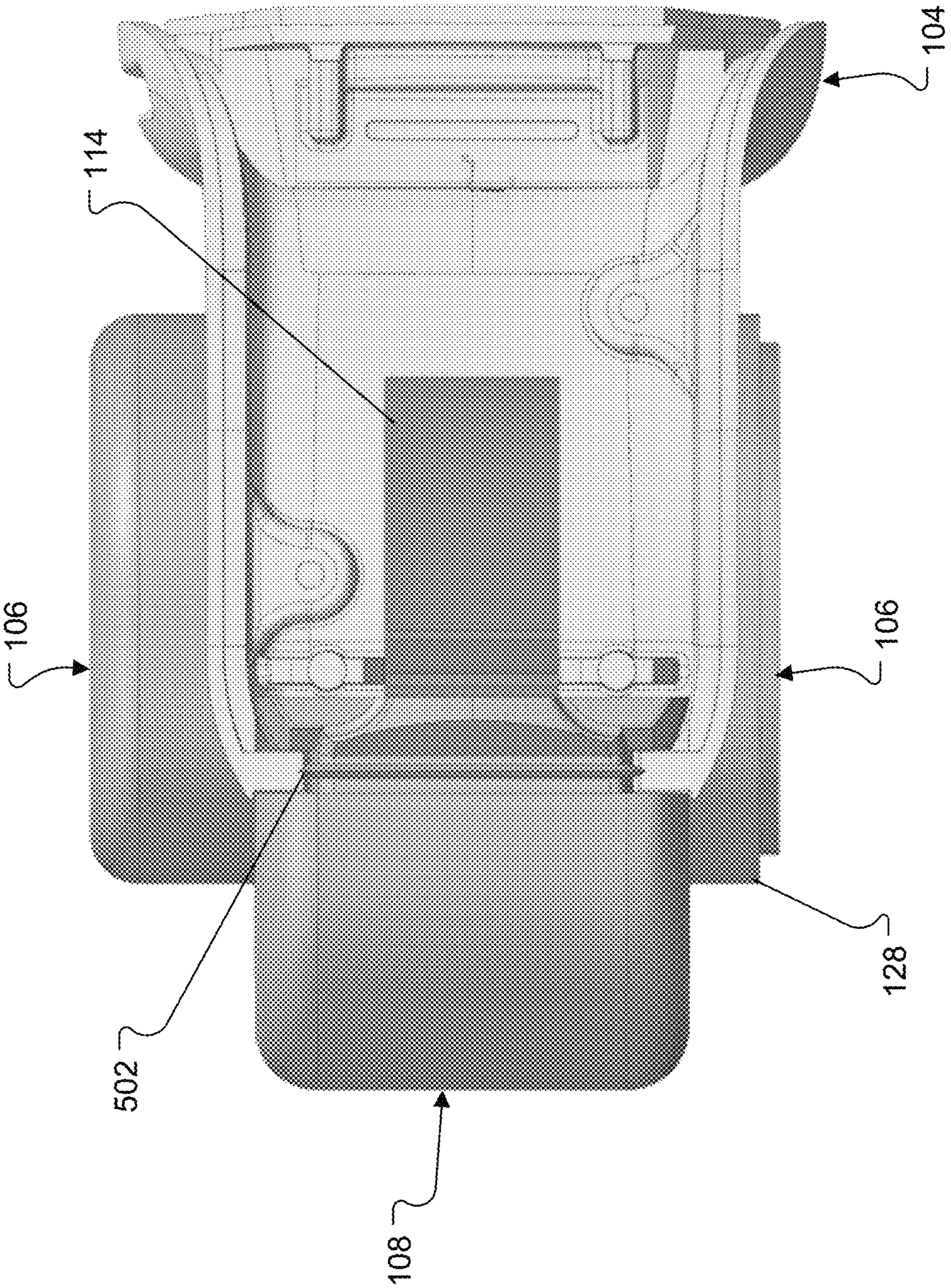

Interface structure 126 is configured to couple the flexible arm 108 to the acoustic module 104, help support and guide the flexible printed circuit, and anchor an over-mold. Terminal enlarged portion 406 is configured to be coupled to acoustic module 104, as shown in FIG. 5A (only a portion of the acoustic module is shown in FIGS. 5A-5C). In some examples, portion 406 is received in a complimentarily-shaped cavity (not shown) in acoustic module 104 and/or acoustic module 104 is made from two (or more) pieces that are snapped together or otherwise fitted together around portion 402. In some examples, an adhesive (such as a pressure sensitive adhesive) is used to more permanently attach interface structure 126 to acoustic module 104.

Interface structure 126 defines a guide 410, for the flexible printed circuit 114. Guide 410 has a width and thickness that is about the same as that of the flexible printed circuit, so that the flexible printed circuit is guided into the acoustic module through a slot 412 that extends through the intermediate narrow portion 404 and the terminal enlarged portion 406. Guide 410 helps to properly center, align, and support the flexible printed circuit. Guide 410 includes a flat surface created by a recess formed in a surface of the main body 402, In some examples herein, an over-mold material 128 encircles and encases the flexible printed circuit along at least most and preferably all of the original resting length of the flexible arm, as well as some and preferably all of any internal supports and interface structures. In some cases, a sleeve (not shown) may be provided to cover the link members 600 before overmolding the over-mold material 128. The sleeve can help prevent the over-mold material 128 (e.g., silicone) from getting into the links or from contacting them directly.

Prior to assembly with the acoustic module 104 (only a portion of the acoustic module is shown in FIGS. 5A-5C), the interface structure 126 is over-molded with the flexible over-mold material 128 (FIGS. 5B & 5C). The interface structure 126 is shown without the over-molder material 128 in FIG. 5A for illustration purposes. The over-mold material 128 forms a gasket 502 (FIGS. 5B & 5C) around the intermediate narrow portion 404, which engages the acoustic module 104 to form a seal therebetween, e.g., to inhibit ingress of liquid or debris into the internal cavity of the acoustic module 104.

Figure 6A:
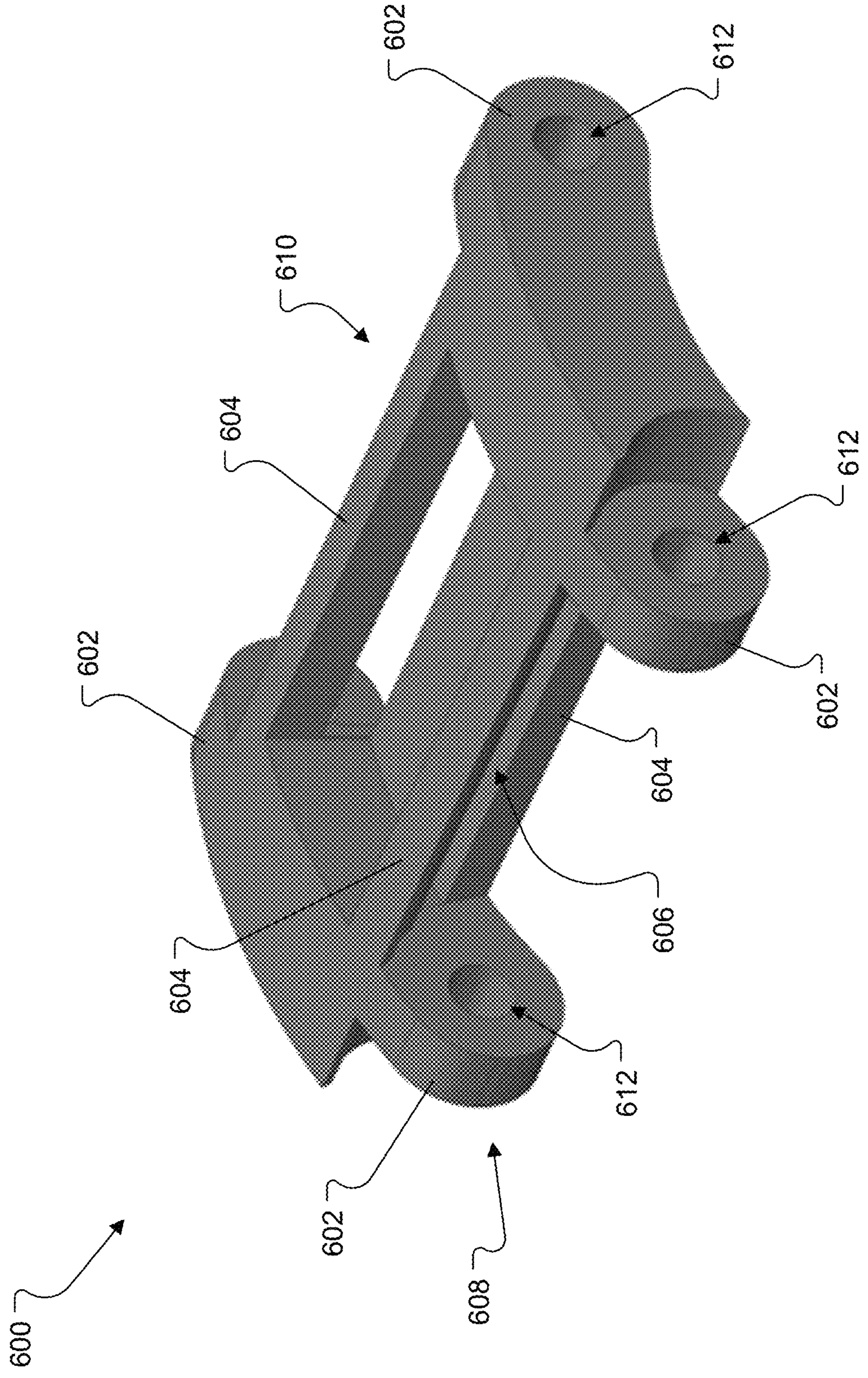
FIGS. 6A and 6B are front and rear perspective views, respectively, of a link member of the open-ear headphone of FIG. 1A.
Figure 6B:
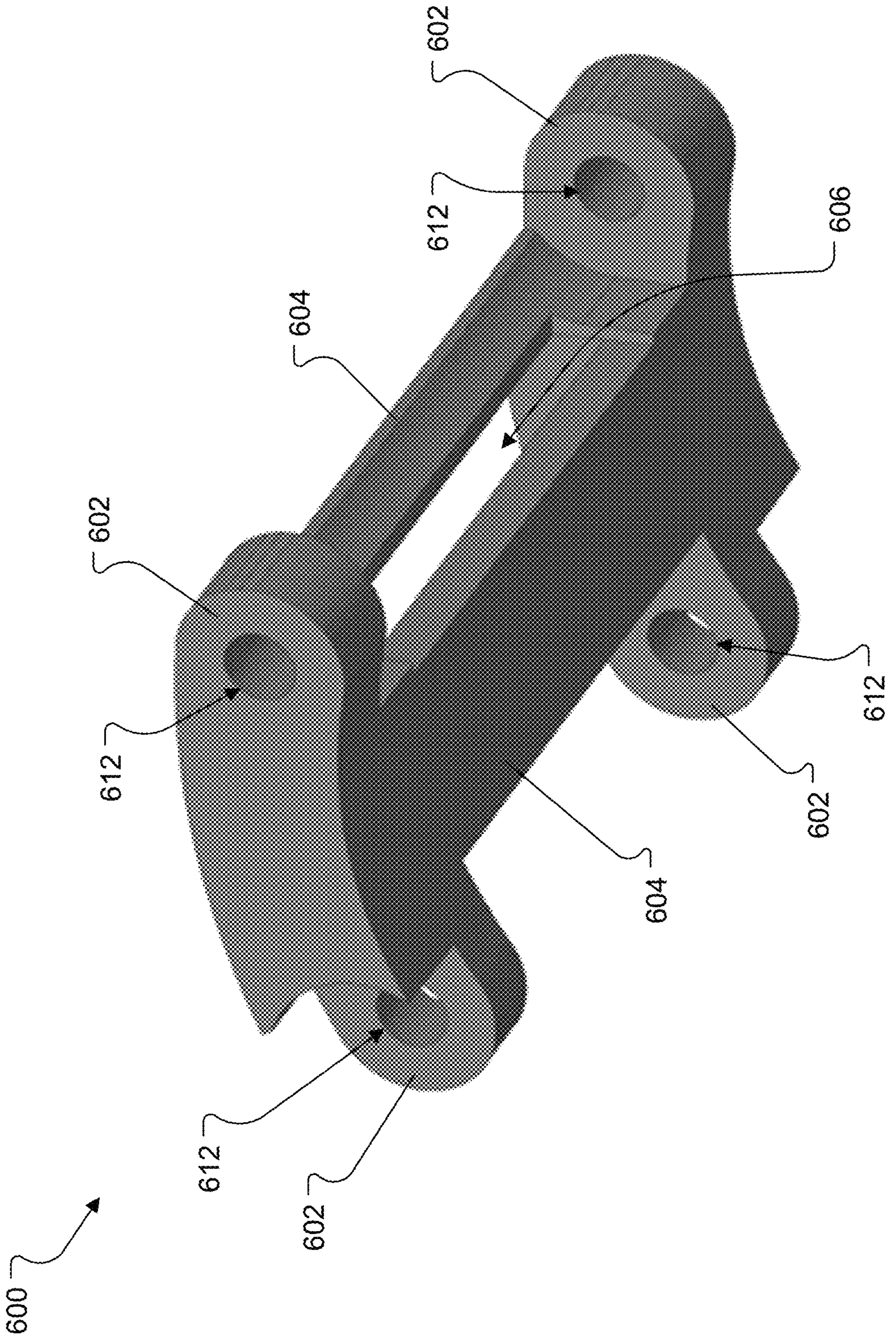
Figure 7A:
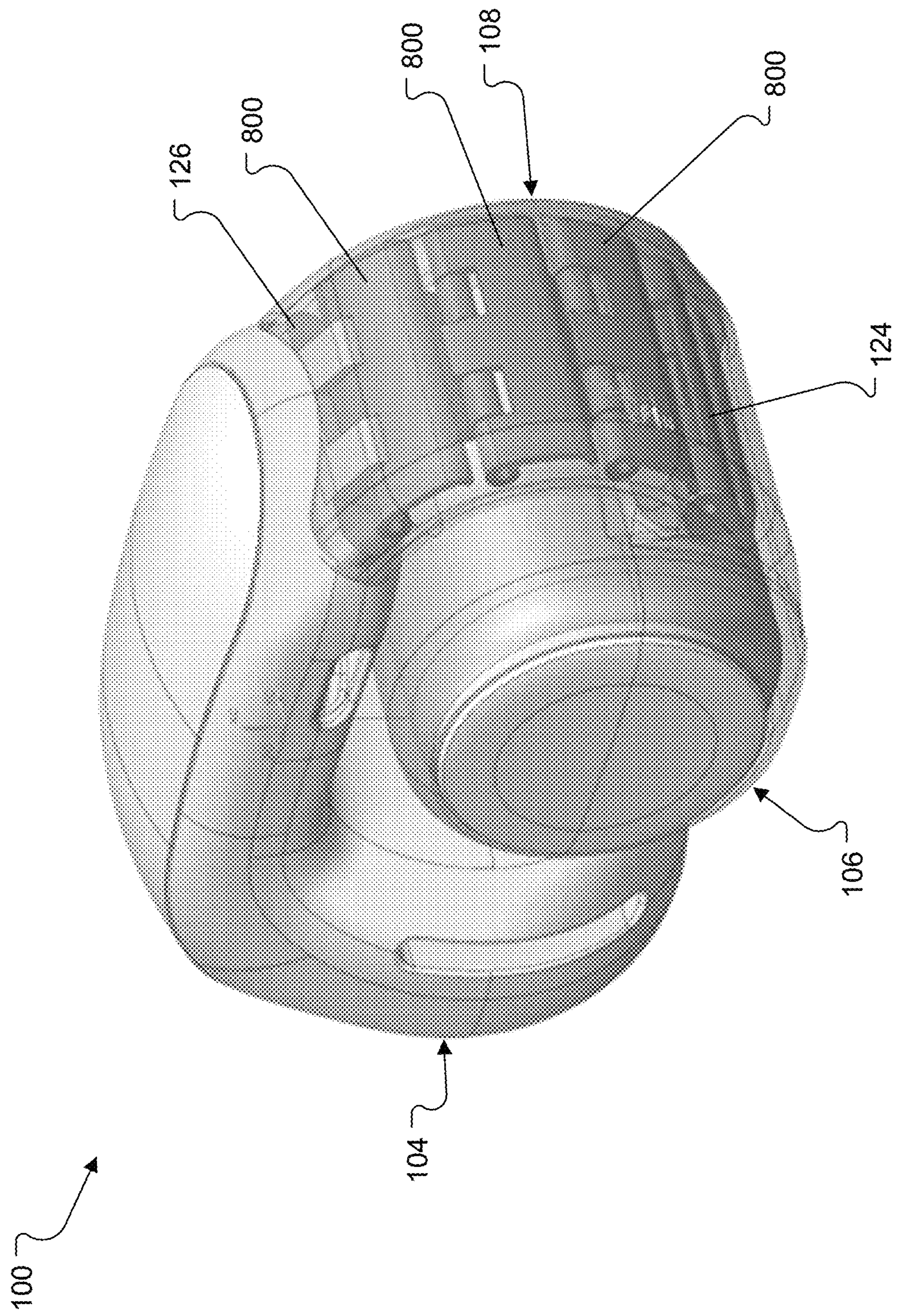
FIGS. 7A and 7B are perspective view of an open-ear headphone with an alternative link member design.
Figure 7B:
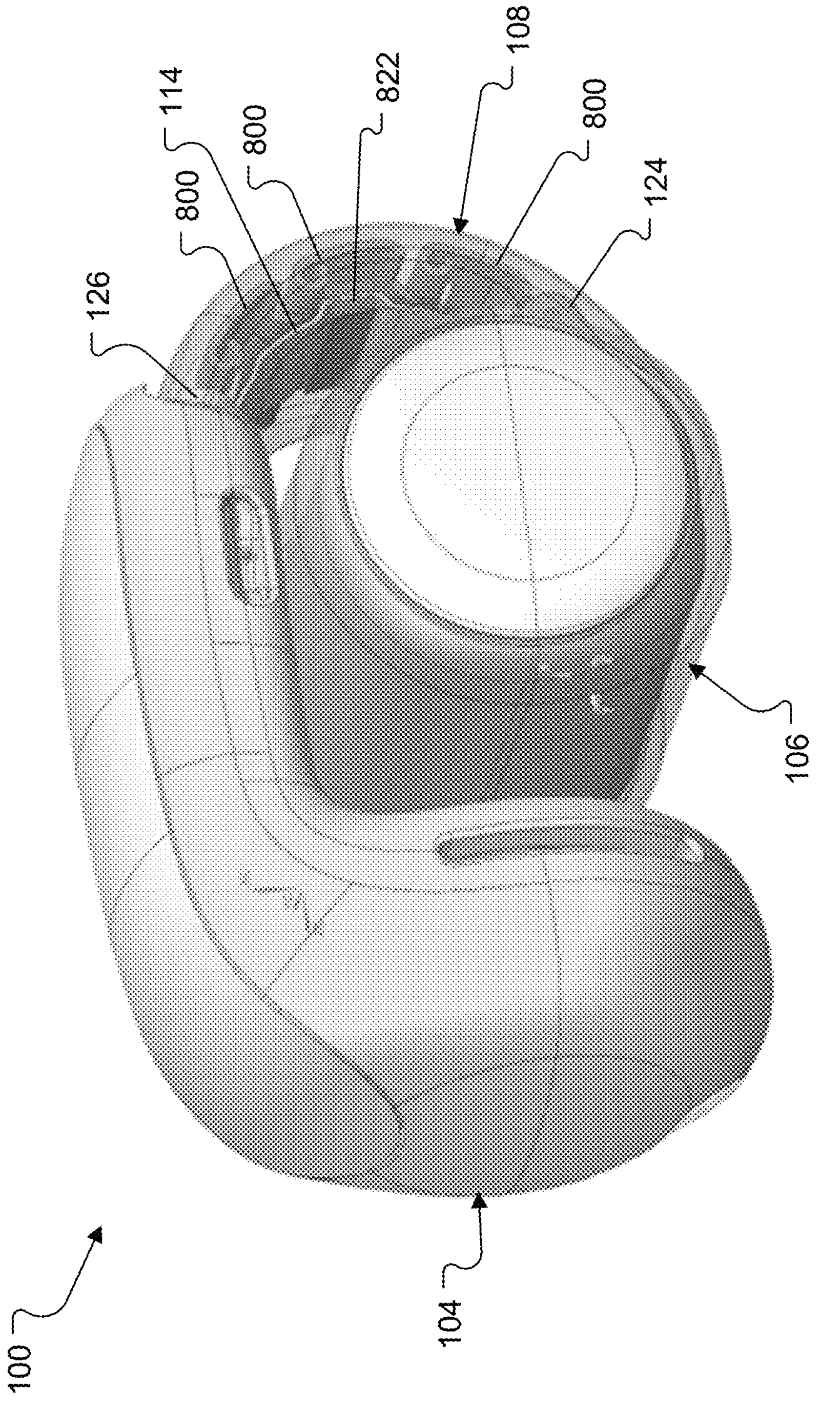
Figure 8A:
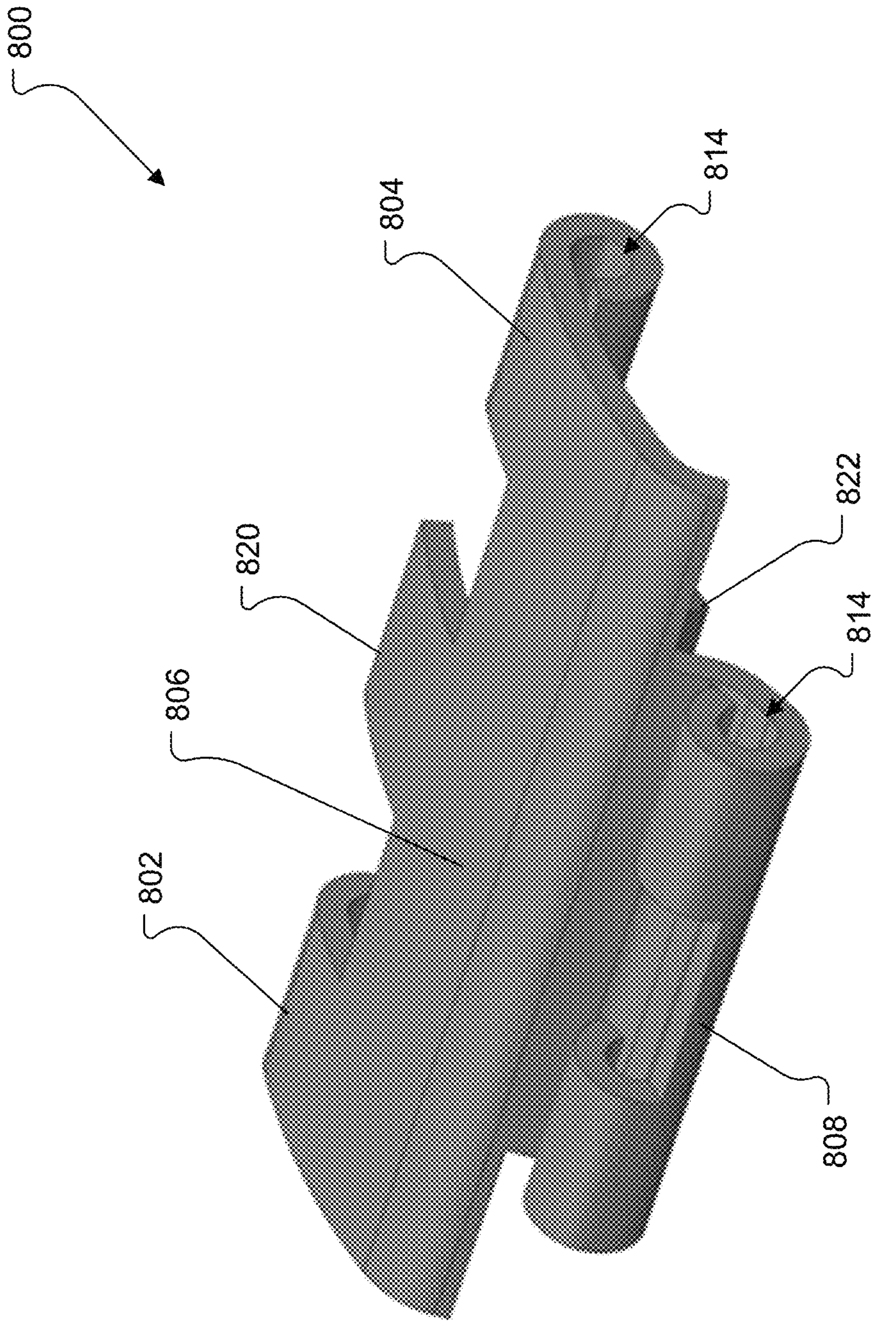
FIGS. 8A and 8B are front and rear perspective views, respectively, of a link member of the open-ear headphone of FIG. 7A.
Figure 8B:
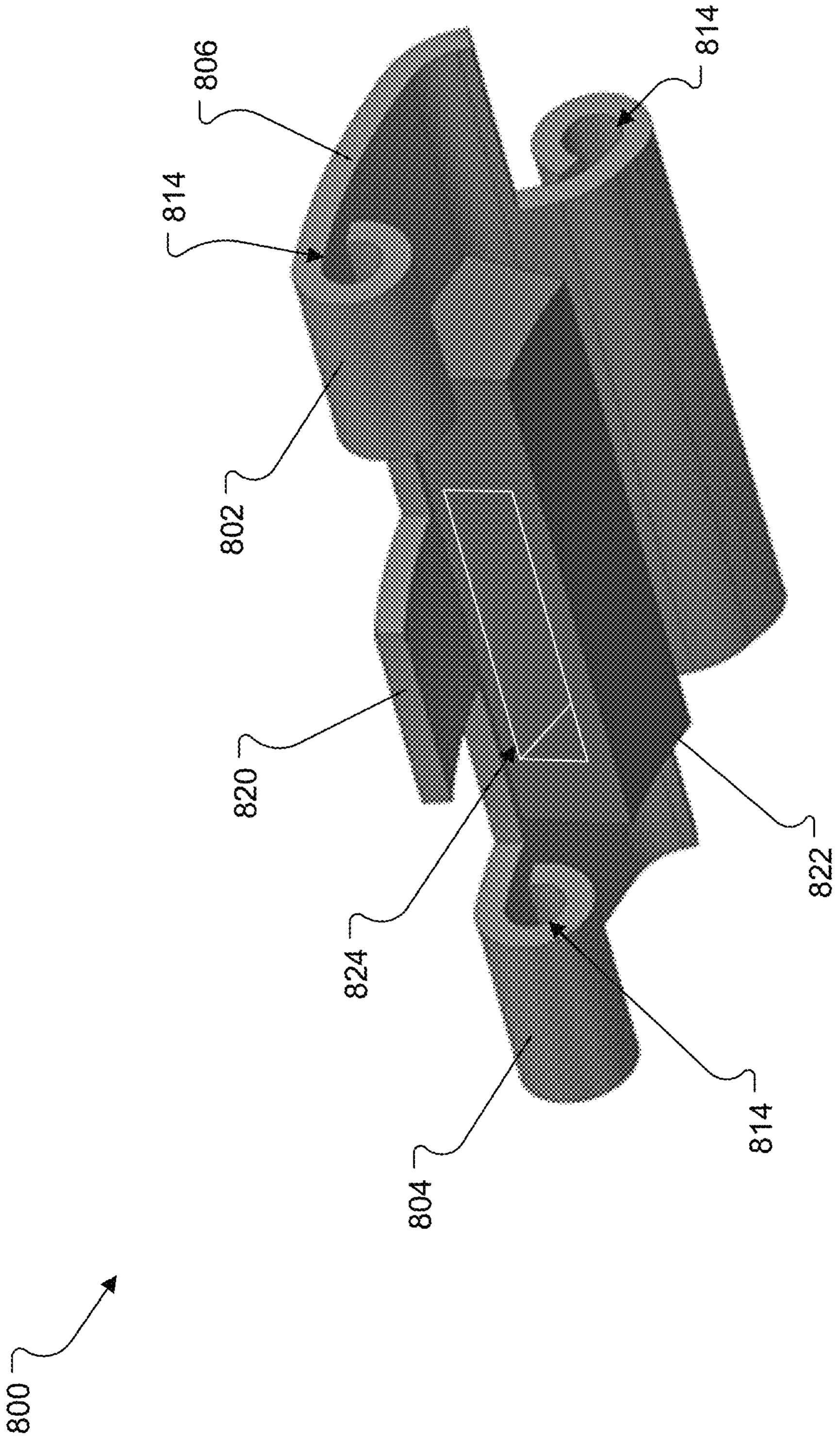

With reference to FIGS. 6A & 6B, one or more link members 600 are disposed between and pivotably coupled to the first and second interface structures 124, 126. Each link member 600 includes a plurality of link arms 602 and one or more bridge members 604 extending therebetween. In the illustrated example, the bridge members 604 are arranged to define a channel 606 between the link arms 602 for accommodating the flexible printed circuit 114.

Each of the link arms 602 includes a hole 612 for receiving a pivot pin 130 (FIG. 1C) for coupling the link members 600 to each other and to the first and second interface structures. In the example illustrated in FIG. 1D, which includes a plurality of link members 600 arranged in series, the link arms 602 arranged along a distal end 610 of the link members 600 are configured to fit around the link arms 602 arranged along a proximal end 608 of an adjacent one of the link members 600. The link arms 602 arranged along the proximal end 608 of the first link member 600 in the series are configured to fit between the pivot arms 208 (FIGS. 2A & 2B) on the first interface structure 124, and the links arms 602 arrange along the distal end 610 of the last link member 600 in the series are configured to fit around a pair pivot arms 414 on the second interface structure 126. Pivot pins 130 (FIG. 1C) extend through holes in the links arms 602 to pivotably couple the link members 600 together. Similarly, pivot pins 130 extend through holes in the first and last link members 600 and the first and second interface structure 124, 126, respectively, to pivotable couple the link members 600 to the battery housing 106 and the acoustic module 104. In some cases, each of the link members 600 may also include a motion limiting feature, such as a bump or wedge that extends outwardly from one of the bridge members 606, that provides a mechanical limit on rotation of the link members 600. The links can be formed of plastic (e.g., cast urethane).

A manner in which flexible printed circuit 114 interfaces with the link members 600, interface structure 124 and interface structure 126 is illustrated in FIGS. 1C & 1D. A first end 132 of the flexible printed circuit 114 is configured to interface with a printed circuit board that connects to the two terminals of the battery 110 (FIG. 1C) in battery housing 106, while second end 136 is configured to interface with a printed circuit board (such as printed circuit board 116, FIG. 1C) in acoustic module 104. In order to accommodate flexing of arm 108 while reducing stress on flexible printed circuit 114, flexible printed circuit 114 can have a length in arm 108 that is longer than the nominal resting length of arm 108. The additional length can be accomplished with one or more curves in the flexible printed circuit that are held in flexible arm 108. Such additional length can be accommodated in curves formed in the flexible printed circuit 114. In some examples, the curves 138 are held in place via associated ones of the pivot pins 130. The link members 600 surround and serve to protect the flexible printed circuit board 114. Additionally, the link members 600 inhibit twisting of the flexible arm 108. The link members 600 can be made by injection molding or machining or stamping.

Other Implementations

A different implementation for the link members is illustrated in FIGS. 7A, 7B, 8A and 8B. The link members 800 can be made by injection molding or machining or stamping. In some examples, the link members 800 may be formed (e.g., stamped) from spring steel. The link members 800 include a pair of link arms (first and second link arms 802, 804) that are coupled together via a bridge member 806. A third link arm 808 extends from a mid-section of the bridge member 806. The link arms 802, 804, 808 are provided with holes 814 for receiving a pivot pin 130. The third link arm 808 is configured to fit between the first and second link arms 802, 804 of an adjacent link member 800. The pivot pins 130 pivotably link the link members 800 together. The link arms 802, 804, 808 can be similarly pivotably coupled to pivot arms 208, 414 on the first and second interface structures 124, 126 via pivot pins 130.

The link members 800 may also include motion limiting features 820 that limit the amount of relative rotational movement. This can help to inhibit hyperextension of the flex joint. In the example illustrated in FIGS. 8A & 8B, the motion limiting feature 820 is in the form of a tab that extends outwardly from the bridge member between the first and second link arms 802, 804.

The link members 800 can rotate freely relative to each other before the limiting feature 820 is in contact with the adjacent link member 800. Once the limiting feature 820 on each link makes contact with the adjacent link member 800, any further rotation will cause flexing of the link members 800 and thereby provide the user with a relatively stiff resistance as feedback to inhibit (e.g., prevent) any additional rotation that could damage other plastic parts or the flexible printed circuit 114.

In some cases, a guide member 822 may be provided on one or more of the link members 800. The guide member 822 defines a channel 824 (FIG. 8B) for receiving and supporting the flexible printed circuit 114. The guide member 822 may be formed of silicone and may be secured to the link member 800, e.g., via adhesive or interlocking mechanical features.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A flexible arm that is configured to be located between and physically and electrically connect an acoustic module of an open-ear headphone to a battery housing of the open-ear headphone, the flexible arm comprising:

a flexible printed circuit that extends through the entire original resting length of the flexible arm and comprises a conductor that is configured to carry electrical energy between the acoustic module and the battery housing;

a first interface structure coupled to one of the acoustic module and the battery housing;

at least one link member pivotably coupled to the first interface structure; and a flexible material that encases the at least one link member, at least some of the flexible printed circuit and at least some of the first interface structure.

2. The flexible arm of claim 1, wherein the at least one link member is pivotably coupled to the first interface structure via a pivot pin that passes through respective holes in the at least one link member and the first interface structure.

3. The flexible arm of claim 1, wherein the at least one link member inhibits twist of the flexible arm.

4. The flexible arm of claim 1, wherein the at least one link member comprises a plurality of link members pivotably coupled to each other in series.

5. The flexible arm of claim 4, wherein the plurality of link members are pivotably coupled to each other via pivot pins that pass through respective holes defined by the plurality of link members.

6. The flexible arm of claim 1, wherein the at least one link member at least partially surrounds the flexible printed circuit.

7. The flexible arm of claim 1, further comprising a guide member coupled to the at least one link member, wherein the flexible printed circuit passes through a channel in the guide member, thereby coupling the flexible printed circuit to the at least one link member.

8. The flexible arm of claim 7, wherein the guide member is formed of silicone.

9. The flexible arm of claim 7, wherein the guide member is coupled to the at least one link member via an adhesive.

10. The flexible arm of claim 1, further comprising a second interface structure coupled to the other one of the acoustic module and the battery housing, wherein the at least one link member is pivotably coupled to the second interface structure.

11. The flexible arm of claim 10, wherein the at least one link member comprises a plurality of link members pivotably coupled to each other and arranged in series between the first interface member and the second interface member.

12. The flexible arm of claim 1, wherein the at least one link member comprises a motion limiting feature that limits rotational movement of the link member.

13. The flexible arm of claim 1, wherein the at least one link member is formed of a rigid plastic.

14. The flexible arm of claim 1, wherein the at least one link member is formed of metal.

15. The flexible arm of claim 1 wherein the flexible material is overmolded on the at least one link member, at least some of the flexible printed circuit and at least some of the first interface structure.

16. The flexible arm of claim 1 wherein the flexible material comprises an external layer of the entire flexible arm.

17. The flexible arm of claim 1 wherein the original resting position of the flexible arm lies along a curved axis that defines a simple open curve.

18. The flexible arm of claim 1, wherein the first interface structure comprises one or more centering features to assist within centering the first interface structure within a cavity in the battery housing.

19. The flexible arm of claim 1, wherein the first interface structure comprises one or more guide members that provide a hard stop that butts up against the battery housing to limit inward movement of the first interface structure into a cavity in the battery housing during assembly.

20. The flexible arm of claim 1, wherein the flexible material defines a gasket that provides a seal between the first interface member and the acoustic module.

* * * * *